United States Patent [19]

Yih

[11] 3,840,362
[45] Oct. 8, 1974

[54] HERBICIDAL COMPOSITIONS CONTAINING AN ALANINE DERIVATIVE AND A 4-NITRODIPHENYL ETHER

[75] Inventor: Roy Y. Yih, Doyleston, Pa.

[73] Assignee: Rohm and Haas Company, Philadelphia, Pa.

[22] Filed: Mar. 6, 1972

[21] Appl. No.: 232,251

[52] U.S. Cl. .................................. 71/111, 71/124
[51] Int. Cl. ............................................. A01n 9/20
[58] Field of Search ............................. 71/111, 124

[56] References Cited
UNITED STATES PATENTS

| | | |
|---|---|---|
| 3,231,358 | 1/1966 | Wilson et al. ........................ 71/124 |
| 3,316,080 | 4/1967 | Inoue et al. ......................... 71/124 |
| 3,598,859 | 8/1971 | Yates et al. ......................... 71/111 |

FOREIGN PATENTS OR APPLICATIONS

| | | | |
|---|---|---|---|
| 3,905 | 2/1968 | Japan ................................. | 71/124 |
| 22,279 | 2/1965 | Japan ................................. | 71/111 |

*Primary Examiner*—Glennon H. Hollrah

[57] ABSTRACT

Herbicidal compositions which comprise a mixture of (A) the ethyl ester of N-benzoyl-N-(3,4-dichlorophenyl)-alanine and (B) 2,4-dichlorphenyl 4-nitrophenyl ether or 2,4,6-trichlorophenyl 4-nitrophenyl ether, and a method of weed control with them.

2 Claims, No Drawings

HERBICIDAL COMPOSITIONS CONTAINING AN ALANINE DERIVATIVE AND A 4-NITRODIPHENYL ETHER

This invention relates to herbicidal compositions. In particular, it concerns compositions comprising synergistic mixtures of (A) the ethyl ester of N-benzoyl-N-(3,4-dichlorophenyl)alanine, and (B) 2,4-dichlorophenyl 4-nitrophenyl ether or 2,4,6-trichlorophenyl 4-nitrophenyl ether.

2,4-Dichlorophenyl 4-nitrophenyl ether is a commercial pre- and postemergent herbicide which has found use for weed control in such diverse crops as carrots, celery, cole crops, onions, ornamentals, rape, rice and wheat. Its properties are described in U.S. Pat. No. 3,080,225.

2,4,6-Trichlorophenyl 4-nitrophenyl ether has been offered as a herbicide for the control of weeds in cabbage, rape, rice, wheat, etc. Its properties are described in U.S. Pat. No. 3,316,080.

The ethyl ester of N-benzoyl-N-(3,4-dichlorophenyl)-alanine has been patented as a herbicide and its properties are discussed under the basic Agdoc number H-2763 in several patents such as Belgian 714,007. Its main forte appears to be the control of wild oats.

It has now been found that combinations of the ethyl ester of N-benzoyl-N-(3,4-dichlorophenyl)alanine with 2,4-dichlorophenyl 4-nitrophenyl ether or 2,4,6-trichlorophenyl 4-nitrophenyl ether produce synergistic mixtures which give an unpredictable enhanced weed control. This is of particular value for the control of wild oats. This effect is produced when the ratio of A) the ethyl ester of N-benzoyl-N-(3,4-dichlorophenyl)alanine to B) 2,4-dichlorophenyl 4-nitrophenyl ether or of 2,4,6-trichlorophenyl 4-nitrophenyl ether is in the range of 1:10 to 10:1 parts by weight. The preferred ratio of A:B is 4:1 to 1:1 parts by weight.

Both component A), the ethyl ester of N-benzoyl-N-(3,4-dichlorophenyl)alanine, and component (B), 2,4-dichlorophenyl 4-nitrophenyl ether (or the 2,4,6-trichlorophenyl 4-nitrophenyl ether) may be used as solutions in common organic solvents or as formulations. Formulations most often contain additionally a surface active agent. Typical formulations well known in the trade are liquid such as emulsifiable concentrates, solid such as dusts or wettable powder, or a solid dispersed in a liquid such as a flowable emulsion.

Typical solvents are naphtha, aromatic hydrocarbons such a xylene, ketones such as methyl ethyl ketone or cyclohexanone, dimethyl formamide and dimethyl sulfoxide. Typical surface active agents, such as emulsifying and dispersing agents, are listed in "Detergents and Emulsifiers — 1970 Annual," published by John W. McCutcheon, Inc., Morristown, N.J.

The two components may be combined together in a single solution or formulation or they may be added as separate solutions or formulations to a spray tank prior to application of the mixture.

Typical formulations are as follows:

Example 1 — An emulsifiable concentrate

| component | parts |
|---|---|
| 2,4-dichlorophenyl 4-nitrophenyl ether | 25 g. |
| xylene | 70 g. |
| Octylphenoxy-polyoethoxy-ethanol | 5 g. |

Example 2 — An emulsifiable concentrate

| component | parts |
|---|---|
| 2,4,6-trichlorophenyl 4-nitrophenyl ether | 25 g. |
| solvent naphtha | 70 g. |
| polyoxyethylene alkylphenyl ether | 5 g. |

Example 3 — An emulsifiable concentrate

| component | parts |
|---|---|
| ethyl ester of N-benzoyl-N-(3,4-dichlorophenyl)alanine | 50 g. |
| a blend of oil-soluble amine sulfonates with polyoxyethylene ethers sold under the trademarked name of Emcol H-702 | 10 g. |
| xylene | sufficient to give 100 cm³ |

Example 4 — An emulsifiable concentrate

| component | parts |
|---|---|
| ethyl ester of N-benzoyl-N-(3,4-dichlorophenyl)alanine | 20 g. |
| a blend of poly(ethylene oxide) and an alkyl sulfonate sold under the trademarked name of Tensiofix AS | 10 g. |
| a blend of poly(ethylene oxide) and castor oil sold under the trademarked name of Tensiofix D 120 | 10 g. |
| N-methyl-pyrrolidone | sufficient to give 100 cm³ |

Example 5 — A suspension

| component | parts |
|---|---|
| ethyl ester of N-benzoyl-N-(3,4-dichlorophenyl)alanine | 10 g. |
| acetone | 50 g. |
| water | 50 g. |
| alkylaryl polyether alcohol sold under the trademarked name of Triton X-155 | 0.5 g. |
| glycerine | 1.0 g. |

Example 6 — A wettable powder

| component | parts |
|---|---|
| 2,4-dichlorophenyl 4-nitrophenyl ether | 10 g. |
| calcium silicate | 40 g. |
| clay, e.g. a kaolinite | 50 g. |
| a 1:3 blend of nonylphenoxypolyethoxyethanol with magnesium carbonate | 1 g. |

This is blended by grinding.

Example 7 — A dispersion

| component | parts |
| --- | --- |
| 2,4-dichlorophenyl 4-nitrophenyl ether | 10 g. |
| calcium silicate | 40 g. |
| synthetic precipitated hydrated silicon dioxide | 50 g. |
| sodium naphthalene formaldehyde sulfonate | 3 g. |

When diluted with water, a good dispersion results.

Example 8 — A dust

| component | parts |
| --- | --- |
| 2,4,6-trichlorophenyl 4-nitrophenyl ether | 10 g. |
| calcium silicate | 40 g. |
| talc | 50 g. |

The mixture is blended by grinding.

Example 9 — An emulsifiable concentrate

| component | parts |
| --- | --- |
| 2,4-dichlorophenyl 4-nitrophenyl ether | 10 g. |
| ethyl ester of N-benzoyl-N-(3,4-dichlorophenyl)alanine | 15 g. |
| xylene | 35 g. |
| mesityl oxide | 35 g. |
| blended alkylaryl polyether alcohols with organic sulfonates sold under the trademarked name of Triton | 5 g. |

Example 10 — An emulsifiable concentrate

| component | parts |
| --- | --- |
| 2,3,4-trichlorophenyl 4-nitrophenyl ether | 15 g. |
| ethyl ester of N-benzoyl-N-(3,4-dichlorophenyl)alanine | 20 g. |
| xylene | 30 g. |
| isophorone | 30 g. |
| blended alkylaryl polyether alcohols with organic sulfonates sold under the trademarked name of Triton | 5 g. |

Note that Examples 9 and 10 are of a premixed combination of components (A) and (B). Examples 1-8 exemplify a formulation of either component (A) or (B) alone which is useful for combining like formulations into a single package at any time up to just prior to the application to the locus where weed control is desired. If desired other compatible pesticides or plant nutrients may be incorporated into the compositions of this invention.

The compositions of this invention may be used for weed control by applying them to the locus to be protected from weeds, or as blanket treatments to tolerant crops or as directed applications to a growing crop, usually a row crop. Preferably the materials are applied after weeds have appeared. Generally a dosage of from one half to twenty pounds per acre of the combination of the ethyl ester of N-benzoyl-N-(3,4-dichlorophenyl)alanine with 2,4-dichlorophenyl 4-nitrophenyl ether or 2,4,6-trichlorophenyl 4-nitrophenyl ether is used. The preferred dosage range is two to eight pounds per acre of the combination. A solution containing the two active ingredients is usually applied as such, for example, as an aerosol type application or by low volume aerial application. Wettable powder and emulsifiable concentrates are usually extended with water and then applied by conventional sprayers. Rates of application vary from 1 to 200 gallons per acre.

Tolerant crops include members of the Brassica genus such as mustard grown for mustard seed (e.g., Brassica juncea) and rape (Brassica napus) and cereal grains such as wheat (Triticum vulgare). The weed of most interest for which the combination of herbicides of this invention is particularly effective against is wild oats (Avena fatua). Accordingly, the control of weeds in any tolerant crops where wild oats is a particular problem, such as in fields of rape, and wheat, is of particular interest.

A greenhouse method was used to show the increased weed control and plant tolerance of the combination of components (A) and (B) of this invention over that which would be predicted from the herbicidal activities of the individual components alone.

In this test, evaluations were made on wild oats and crops associated with this weed using 4-, 8-, 11- and 15-day old plants. Some plants were treated with a 15 percent by weight emulsifiable concentrate form of the ethyl ester of N-benzoyl-N-(3,4-dichlorophenyl)alanine similar to the one described in Example 3 above and available as an experimental herbicide from Shell Chemical Company under the code number of WL-17731. Other plants were treated with a 25 percent by weight emulsifiable concentrate form of 2,4-dichlorophenyl 4-nitrophenyl ether sold commercially under the trademarked name of Tok E-25 which is similar to the one described in Example 1 herein. These two formulations were combined for the evaluation of combinations in this test. All materials were applied as aqueous sprays at varying rates of application in pounds per acre (lbs./A.). The percent control was observed two and four weeks after treatment.

The results are given below in Table I. For convenience the treatments are designated as follows:

A = ethyl ester of N-benzoyl-N-(3,4-dichlorophenyl)alanine
B-1 = 2,4-dichlorophenyl 4-nitrophenyl ether The plants used in the evaluations were:
wild oat — Avena fatua
oat — Avena sativa
barley — Hordeum vulgare
mustard — Brassica juncea
rape — Brassica napus
wheat — Triticum vulgare The rate (lbs./A.) is given on an active ingredient basis.

TABLE I

Herbicidal Data

% Control
4-Day Old Plants

| Treatment | Rate (lbs./A.) | Wild Oat 2* | Wild Oat 4* | Oat 2* | Oat 4* | Barley 2* | Barley 4* | Mustard 2* | Mustard 4* | Rape 2* | Rape 4* | Wheat 2* | Wheat 4* |
|---|---|---|---|---|---|---|---|---|---|---|---|---|---|
| A | 2 | 40 | 80 | 50 | 50 | 0 | 0 | 0 | 0 | 0 | 0 | 0 | 0 |
|  | 4 | 70 | 90 | 70 | 90 | 20 | 0 | 80 | 0 | 80 | 0 | 10 | 0 |
|  | 8 | 80 | 90 | 80 | 80 | 40 | 0 | 20 | 0 | 90 | 0 | 30 | 0 |
| B–1 | 1 | 30 | 0 | 0 | 0 | 20 | 0 | 20 | 0 | 30 | 0 | 10 | 0 |
|  | 2 | 60 | 60 | 60 | 0 | 30 | 0 | 90 | 0 | 40 | 0 | 30 | 0 |
|  | 4 | 100 | 90 | 80 | 0 | 50 | 20 | 90 | 0 | 80 | 0 | 30 | 0 |
| A + B–1 | 2+1 | 70 | 50 | 70 | 60 | 60 | 30 | 0 | 0 | 0 | 0 | 20 | 0 |
|  | 2+2 | 100 | 90 | 100 | 100 | 50 | 70 | 90 | 0 | 0 | 0 | 30 | 0 |
|  | 4+1 | 80 | 100 | 100 | 100 | 20 | 30 | 50 | 0 | 0 | 70 | 0 | 0 |
|  | 4+2 | 100 | 100 | 90 | 90 | 60 | 30 | 70 | 0 | 60 | 0 | 30 | 0 |

8-Day Old Plants

| | | Wild Oat 2 | Wild Oat 4 | Oat 2 | Oat 4 | Barley 2 | Barley 4 | Mustard 2 | Mustard 4 | Rape 2 | Rape 4 | Wheat 2 | Wheat 4 |
|---|---|---|---|---|---|---|---|---|---|---|---|---|---|
| A | 2 | 40 | 70 | 50 | 80 | 20 | 60 | 0 | 0 | 0 | — | 10 | 0 |
|  | 4 | 40 | 90 | 60 | 100 | 30 | 40 | 60 | 0 | — | — | 30 | 0 |
|  | 8 | 40 | 90 | 70 | 100 | 40 | 70 | 70 | 0 | 0 | — | 40 | 0 |
| B–1 | 1 | 30 | 0 | 10 | 0 | 0 | 0 | 20 | 0 | 0 | — | 10 | 0 |
|  | 2 | 30 | 0 | 30 | 0 | 10 | 0 | 30 | 0 | 0 | 20 | 0 | 0 |
|  | 4 | 40 | 0 | 50 | 30 | 20 | 40 | 30 | — | 0 | 20 | 20 | |
| A+b–1 | 2+1 | 30 | 40 | 50 | 60 | 40 | 30 | 30 | 0 | 7 | — | 20 | 0 |
|  | 2+2 | 70 | 90 | 60 | 100 | 70 | 60 | 50 | 0 | — | — | 20 | 0 |
|  | 4+1 | 60 | 90 | 50 | 100 | 50 | 40 | 90 | 0 | — | — | 30 | 0 |
|  | 4+2 | 60 | 90 | 60 | 90 | 70 | 40 | 80 | 0 | — | 0 | 40 | 0 |

% Control
11-Day Old Plants

| | | Wild Oat 2 | Wild Oat 4 | Oat 2 | Oat 4 | Barley 2 | Barley 4 | Mustard 2 | Mustard 4 | Rape 2 | Rape 4 | Wheat 2 | Wheat 4 |
|---|---|---|---|---|---|---|---|---|---|---|---|---|---|
| A | 2 | 10 | 80 | 30 | 99 | 10 | 0 | 0 | 0 | — | — | 10 | 0 |
|  | 4 | 20 | 90 | 30 | 100 | 20 | 0 | 20 | 50 | — | — | 20 | 0 |
|  | 8 | 30 | 90 | 30 | 100 | 30 | 0 | 60 | 0 | — | 0 | 20 | 0 |
| B–1 | 1 | 20 | 20 | 20 | 0 | 10 | 0 | 0 | 0 | — | — | 10 | 0 |
|  | 2 | 30 | 30 | 20 | 0 | 30 | 0 | 40 | 0 | 0 | 20 | — | 0 |
|  | 4 | 50 | 50 | 40 | 30 | 50 | 40 | 40 | 0 | 20 | — | 30 | 0 |
| A+B–1 | 2+1 | 30 | 90 | 40 | 99 | 20 | 20 | 40 | 0 | — | — | 20 | 0 |
|  | 2+2 | 90 | 90 | 70 | 100 | 60 | 40 | 40 | 0 | — | 0 | 0 | 0 |
|  | 4+1 | 80 | 100 | 20 | 100 | 30 | 70 | 20 | 0 | — | — | 20 | 20 |
|  | 4+2 | 80 | 90 | 80 | 100 | 60 | 60 | 80 | 0 | — | 0 | 20 | 0 |

15-Day Ood Plants

| | | Wild Oat 2 | Wild Oat 4 | Oat 2 | Oat 4 | Barley 2 | Barley 4 | Mustard 2 | Mustard 4 | Rape 2 | Rape 4 | Wheat 2 | Wheat 4 |
|---|---|---|---|---|---|---|---|---|---|---|---|---|---|
| A | 2 | 10 | 60 | 30 | 80 | 20 | 60 | 0 | 0 | — | 0 | 0 | 0 |
|  | 4 | 30 | 100 | 40 | 100 | 20 | 60 | 40 | 0 | — | — | 20 | 0 |
|  | 8 | 50 | 100 | 60 | 100 | 20 | 70 | 70 | 0 | — | — | 20 | 0 |
| B–1 | 1 | 10 | 0 | 0 | 0 | 10 | 0 | 30 | 0 | — | — | 10 | 0 |
|  | 2 | 20 | 0 | 10 | 0 | 20 | 0 | 20 | 0 | 0 | 0 | 20 | 0 |
|  | 4 | 30 | 0 | 50 | 0 | 20 | 0 | 50 | 0 | — | — | 20 | 0 |
| A+B–1 | 2+1 | 60 | 100 | 60 | 100 | 20 | 0 | 30 | 0 | 0 | 0 | 50 | 0 |
|  | 2+2 | 70 | 100 | 70 | 100 | 50 | 40 | 30 | 0 | — | 0 | 50 | 0 |
|  | 4+1 | 60 | 100 | 70 | 100 | 40 | 0 | 60 | 0 | — | — | 40 | 0 |
|  | 4+2 | 80 | 100 | 60 | 100 | 40 | 0 | 90 | 0 | — | — | 40 | 0 |

*Weeks after treatment.

It will be noted that excellent control and enhanced activity was obtained with the combinations on both *Avena* species, barley was moderately injured, mustard was injured initially but apparently outgrew this injury so that mustard, rape and wheat are all considered tolerant crops.

The expected value for the combination treatments was calculated by means of the Colby formula (see Weeds, 15, 20 (1967) as follows:

$$E = x + y - (xy/100)$$

wherein $x$ = percent weed control by herbicide A at $p$ lbs./A $y$ = percent weed control by herbicide B at $r$ lbs./A $E$ = the expected weed control by A + B at $p + r$.

As an example of the calculation, refer to Table I under 4-day old wild oat plants (2 week observation) as follows:

Herbicide A at 2 lbs. gives 40 percent Control = $x$
Herbicide B–1 at 2 lb. gives 60 percent Control = $y$ A + B–1 at 2 lbs. + 2 lbs. would be expected to give a percent control of:

$$E = 40 + 60 - 40 \times 60/100 = 100 - 24 = 76 \text{ percent.}$$

A control of 100 percent was observed. A found value higher than the calculated one demonstrates synergism. In the above example the unexpected increase in herbicidal activity was more than 30 percent.

Table II gives the found (from Table I) and calculated values (E of the formula) for the two *Avena* species.

as that described above for Table I data. Component B-2 was the technical solid which was dissolved in acetone then diluted with water to spray strength. Observations were made two weeks after treatment. Table III gives the results as found and calculated.

TABLE III

Herbicidal Data

| Treatment | (lbs./A.) | % Control wild oat found (expected) | wheat |
|---|---|---|---|
| A | 2 | 20 | 0 |
|   | 4 | 25 | 0 |
|   | 8 | 50 | 0 |
| B–2 | 1 | 0 | 0 |
|   | 2 | 50 | 20 |
|   | 4 | 65 | 35 |
| A + B–2 | 2+1 | 60(20)* | 35 |
|   | 2+2 | 80(60)* | 40 |
|   | 4+1 | 80(25)* | 40 |
|   | 4+2 | 85(63)* | 50 |

*Synergism

A high degree of synergism has been demonstrated in the control of wild oats. Although wheat was somewhat injured, it is considered to be a tolerant crop.

This invention provides a means of enhancing the herbicidal activity of the ethyl ester of N-benzoyl-N-(3,4-dichlorophenyl)alanine and thus provides a means of more economical weed control. This is of particular value when the control of wild oats in an economic crop is needed.

I claim:

1. A herbicidal composition consisting essentially of

TABLE II

Synergism of Combinations

| Treatment | Rate lbs./A | % Control given as Found (Expected) | | | |
|---|---|---|---|---|---|
| | | Wild oat 2 | 4 | Oat 2 | 4 |
| | | A) 4-day old plants | | | |
| A + B–1 | 2+1 | 70(63)* | 50(80) | 70(50)* | 60(50)* |
|  | 2+2 | 100(76)* | 90(92) | 100(80)* | 100(50)* |
|  | 4+1 | 80(79) | 100(90)* | 100(70)* | 100(90)* |
|  | 4+2 | 100(88)* | 100(96) | 90(87) | 90(90) |
| | | B) 8-day old plants | | | |
| A + B–1 | 2+1 | 30(58) | 40(70) | 50(55) | 60(80) |
|  | 2+2 | 70(58)* | 90(70)* | 60(65) | 100(80)* |
|  | 4+1 | 60(58) | 90(90) | 50(64) | 100(100) |
|  | 4+2 | 60(58) | 90(90) | 60(72) | 90(100) |
| | | C) 11-day old plants | | | |
| A + B–1 | 2+1 | 30(28) | 90(84)* | 40(44) | 99(99) |
|  | 2+2 | 90(37)* | 90(86) | 70(44)* | 100(99) |
|  | 4+1 | 80(36)* | 100(92)* | 20(44) | 100(100) |
|  | 4+2 | 80(44)* | 90(93) | 80(44)* | 100(100) |
| | | D) 15-day old plants | | | |
| A + B–1 | 2+1 | 60(19)* | 100(60)* | 60(30)* | 100(80)* |
|  | 2+2 | 70(28)* | 100(60)* | 70(37)* | 100(80)* |
|  | 4+1 | 60(37)* | 100(100) | 70(30)* | 100(100) |
|  | 4+2 | 80(44)* | 100(100) | 60(46)* | 100(100) |

*Synergism (Found value is higher than the calculated by more than 5%).

A demonstration of synergism is observed for every age of plant but is particularly pronounced for the 11-day old and 15-day old plants.

Another greenhouse evaluation was made using:
Component A (as above) and
Component B-2 2,4,6-trichlorophenyl 4-nitrophenyl ether.

The test was run on 11-day old wheat and wild oat plants. The formulation of component A used the same a herbicidally effective amount of an admixture of component (A) the ethyl ester of N-benzoyl-N-(3,4-dichlorophenyl)alanine and component (B) 2,4-dichlorophenyl 4-nitrophenyl ether or 2,4,6-trichlorophenyl 4-nitrophenyl ether wherein the weight ratio of component A to component B is 1:1.

2. A herbicidal composition according to claim 1 wherein component B is 2,4-dichlorophenyl 4-nitrophenyl ether.

* * * * *